United States Patent [19]
Rhee

[11] Patent Number: 6,137,908
[45] Date of Patent: Oct. 24, 2000

[54] HANDWRITING RECOGNITION SYSTEM SIMULTANEOUSLY CONSIDERING SHAPE AND CONTEXT INFORMATION

[75] Inventor: Sung Sik Rhee, Redmond, Wash.

[73] Assignee: Microsoft Corporation, Redmond, Wash.

[21] Appl. No.: 08/269,156

[22] Filed: Jun. 29, 1994

[51] Int. Cl.[7] .................................................. G06K 9/00
[52] U.S. Cl. ........................ 382/187; 382/226; 382/229
[58] Field of Search .................................. 382/186, 187, 382/179, 203, 226, 227, 228, 229

[56] References Cited

U.S. PATENT DOCUMENTS

| | | | |
|---|---|---|---|
| 3,133,266 | 5/1964 | Frishkopf | 382/186 |
| 5,050,219 | 9/1991 | Maury | 382/186 |
| 5,105,468 | 4/1992 | Guyon et al. | 382/155 |
| 5,133,023 | 7/1992 | Bokser | 382/229 |
| 5,151,950 | 9/1992 | Hullender | 382/229 |
| 5,193,121 | 3/1993 | Elischer et al. | 382/135 |
| 5,233,547 | 8/1993 | Kapp et al. | 364/705.02 |
| 5,237,628 | 8/1993 | Levitan | 382/317 |
| 5,239,592 | 8/1993 | Kameyama et al. | 382/187 |
| 5,243,149 | 9/1993 | Comerford et al. | 178/18 |
| 5,247,137 | 9/1993 | Epperson | 178/18 |
| 5,267,327 | 11/1993 | Hirayama | 382/187 |
| 5,285,505 | 2/1994 | Kim et al. | 382/187 |
| 5,287,415 | 2/1994 | Chefalas et al. | 382/119 |
| 5,287,417 | 2/1994 | Eller et al. | 382/276 |
| 5,297,216 | 3/1994 | Sklarew | 382/187 |
| 5,392,363 | 2/1995 | Fujisaki et al. | 382/187 |

FOREIGN PATENT DOCUMENTS 0 439 743   8/1991   European Pat. Off. ......... G06K 9/68

OTHER PUBLICATIONS

Vlontzos et al., "A Hierarchical System for Character Recognition", Feb., 1989 IEEE, pp. 1–4.

Sinha et al., "Hybrid Contextual Text Recognition with String Matching", 1993 IEEE Transactions on Pattern Analysis and Machine Intelligence, Sep. 15, 1993, pp. 915–925.

*Primary Examiner*—Andrew W. Johns
*Attorney, Agent, or Firm*—Klarquist Sparkman Campbell Leigh & Whinston LLP

[57] ABSTRACT

The speed and accuracy of a computer implemented handwriting recognition system is enhanced by several innovations, including integrated segmentation and context processing. The recognition processing occurs while the user is providing ink data. The system quickly reaches the recognition result once all of the input is received. More than one result may be returned by the system.

11 Claims, 7 Drawing Sheets

HANDWRITING RECOGNITION SYSTEM SIMULTANEOUSLY CONSIDERING SHAPE AND CONTEXT INFORMATION

FIELD OF THE INVENTION

The present invention relates to a computer implemented handwriting recognition system.

BACKGROUND AND SUMMARY OF THE INVENTION

Handwritten information may be used as computer input once it is converted to digital form. Handwritten information may be collected by any of a number of mechanisms. Typically, the tip of a pen or stylus that is held by the user is placed in contact with a tablet device that includes sensing mechanisms for detecting the position of the pen tip. Movement of the pen tip along the tablet, such as occurs when the user prints or writes, generates a stream of pen tip position data. The data may be an array of "x" and "y" position coordinates, and may be referred to as "ink" or "ink data." Handwriting recognition systems process such ink data for the purpose of transforming the user's handwritten information into digital information that can be used with any conventional computer application, such as word processing.

The primary design considerations for handwriting recognition systems are speed and accuracy. One of the factors affecting the speed with which handwriting recognition can progress relates to how computer processing time is allocated to the recognition task. For example, earlier recognition systems postponed the processing of ink data until all of the ink data was provided by the user. Such an approach failed to efficiently use processing time that was available as the computer was collecting ink data.

The speed and accuracy with which a handwriting recognition system transforms written information to corresponding digital information may suffer as a result of the order by which the ink data is processed. In some prior systems, for example, ink data was first processed to determine which alphanumeric characters were most likely formed from a series of pen movements made on the tablet. Such character identification is often referred to as segmentation processing. The likely characters were thereafter processed to determine whether or not a character was meaningful in the literal context of the other likely characters. This latter processing is referred to as context processing.

The problem with such sequential segmentation processing and context processing is that the selection of likely characters takes place without access to the context information. Put another way, segmentation processing takes place with limited information, without reference to context information that could be advantageously used to assist with the determination of the most likely characters. The accuracy of the context processing is correspondingly hindered because the context processing commences with characters that are determined by a segmentation process that is based on such limited information.

The present invention is directed to a system for increasing handwriting recognition speed and accuracy by the application of a number of innovations. For example, the present system (which will hereafter be occasionally referred to as "the recognizer") begins processing ink data as soon as the user begins to write on the tablet. Accordingly, the final recognition result is available very soon after all of the ink is collected.

As another aspect of the present invention, segmentation and context processing are integrated in order to significantly increase the accuracy of the overall recognition process. This integration is achieved by modeling a recognition task as a dynamic programming problem and constructing paths of multiple character hypotheses from the stream of ink data. The recognizer searches the multiple paths to find the optimal path, which is the string of characters most likely to match what the user wrote on the tablet. Each node of a path represents a discrete portion of the ink data. Each node has associated with it a probability or cost value that is the aggregate of the cost values assigned to the node by several modeling components. Some of the components provide cost values that relate to the probable character represented by the node. Other components provide cost values pertaining to the context of the node information. As a result, the highest probability or estimate of the correct word or sentence construction is made using, concurrently, context and segmentation processing. This segmentation/context integration greatly enhances the accuracy of the recognition system.

The dynamic programming path search (hereafter referred to as the DPP search) begins essentially as soon as the user begins to write. This search serves as a forward pass in the recognition process and is coupled with a second, reverse-pass search of the paths. The second search occurs once all of the ink data is collected. The DPP search generates the costs of the paths based upon the cost value provided by the modeling components mentioned above. These path costs are used as estimates for the second search, which is a stack-based bounded path search (hereafter referred to as the SBP search). The SBP search uses the estimates generated by the DPP search and refers to a system dictionary to add to the DPP search path estimates the probability that the word or words found in the path appear in the dictionary. The SBP search arrives at the overall optimal (most likely) recognition result. The SBP search can produce and rank a number of probable results. The results are made available to the application that calls upon the recognizer.

Other inventive aspects of this invention will become clear upon review of the following description.

BRIEF DESCRIPTION OF THE DRAWINGS

FIG. 1(*b*) is a representation of data points associated with a handwritten character.

FIG. 1(*c*) is a diagram of a series of ink strokes that combine to form a character.

DETAILED DESCRIPTION

Figure 1A:
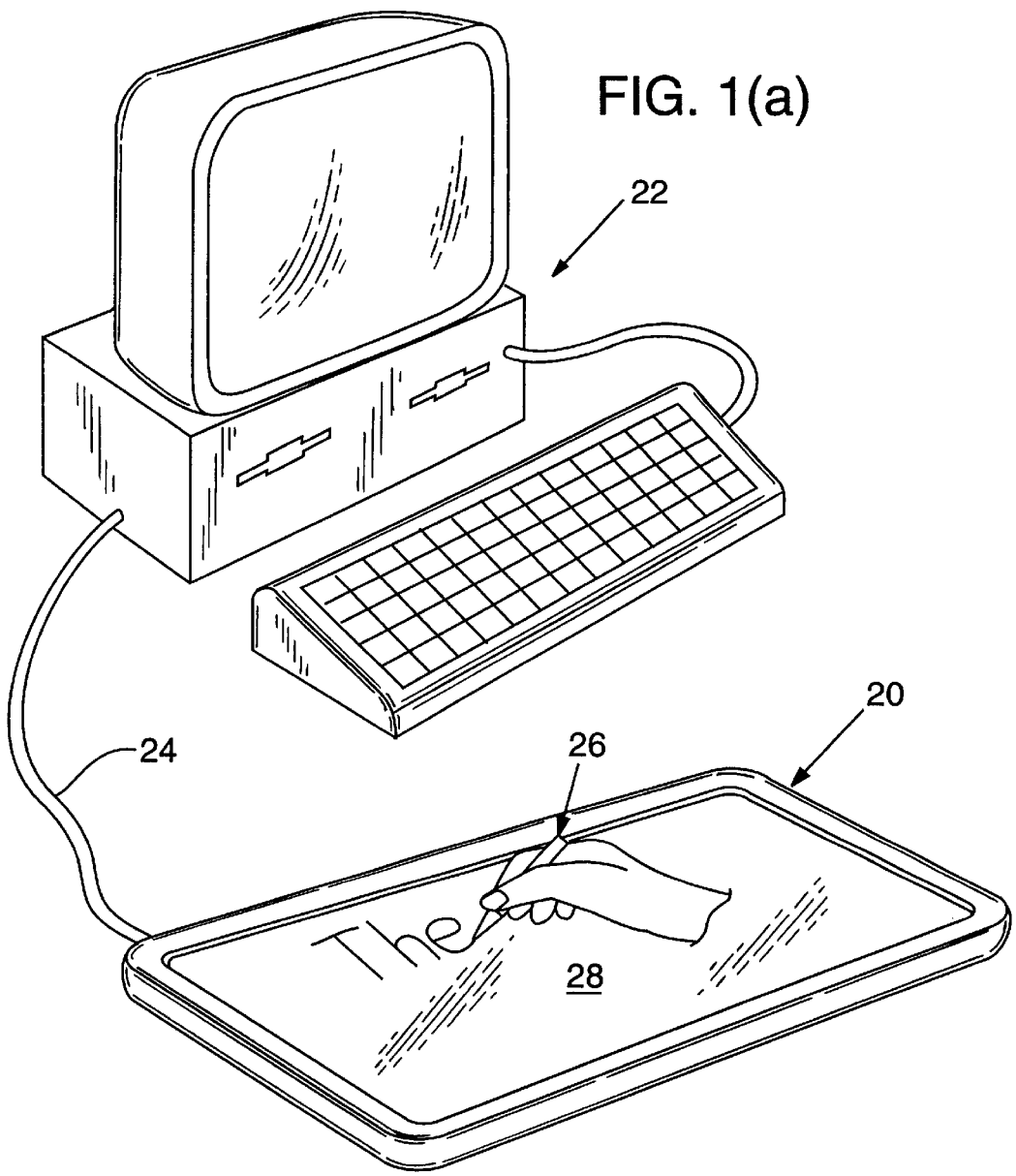
FIG. 1(*a*) is a diagram of mechanisms for collecting data representative of handwritten information.

The diagram of FIG. 1(a) represents a system with which the methods of the present invention may be implemented. An electronic digitizing tablet 20 is connected to a computer 22 by a cable 24. The user provides handwritten information to the computer by moving the tip of a stylus or pen 26 across the screen 28 of the tablet 20 in a manner substantially identical to printing on paper. Typically, the tablet 20 will include mechanisms for displaying on the tablet what the user writes on the screen 28.

The tablet may include a conventional grid of conductive strips underlying the screen 28. The pen 26 serves as a probe having a conductive tip. The position of the tip is detected by the grid when the user brings the tip into contact with the screen. The tablet makes available to the computer the data that is representative of the pen tip position. The data may be in the form of a stream of "x" and "y" location coordinates.

It will be appreciated that any of a variety of mechanisms may be employed for providing data indicative of a pen position. Moreover, the tablet and computer components used for implementing the present invention may be incorporated into a single hand-held device.

When an application that is run on the computer seeks as input handwritten information on the tablet, the computer samples the x-y coordinate data at a rate, for example, of 200 times per second and calls upon the recognizer of the present invention to process the ink data by correlating that data to known characters. The recognizer provides its results to the application. For the purposes of this description, the term "character" refers to an alphanumeric character or symbol. A "recognition task" will refer to the handwriting recognition performed by the recognizer on a specified, uninterrupted amount of handwritten information.

Figure 2:
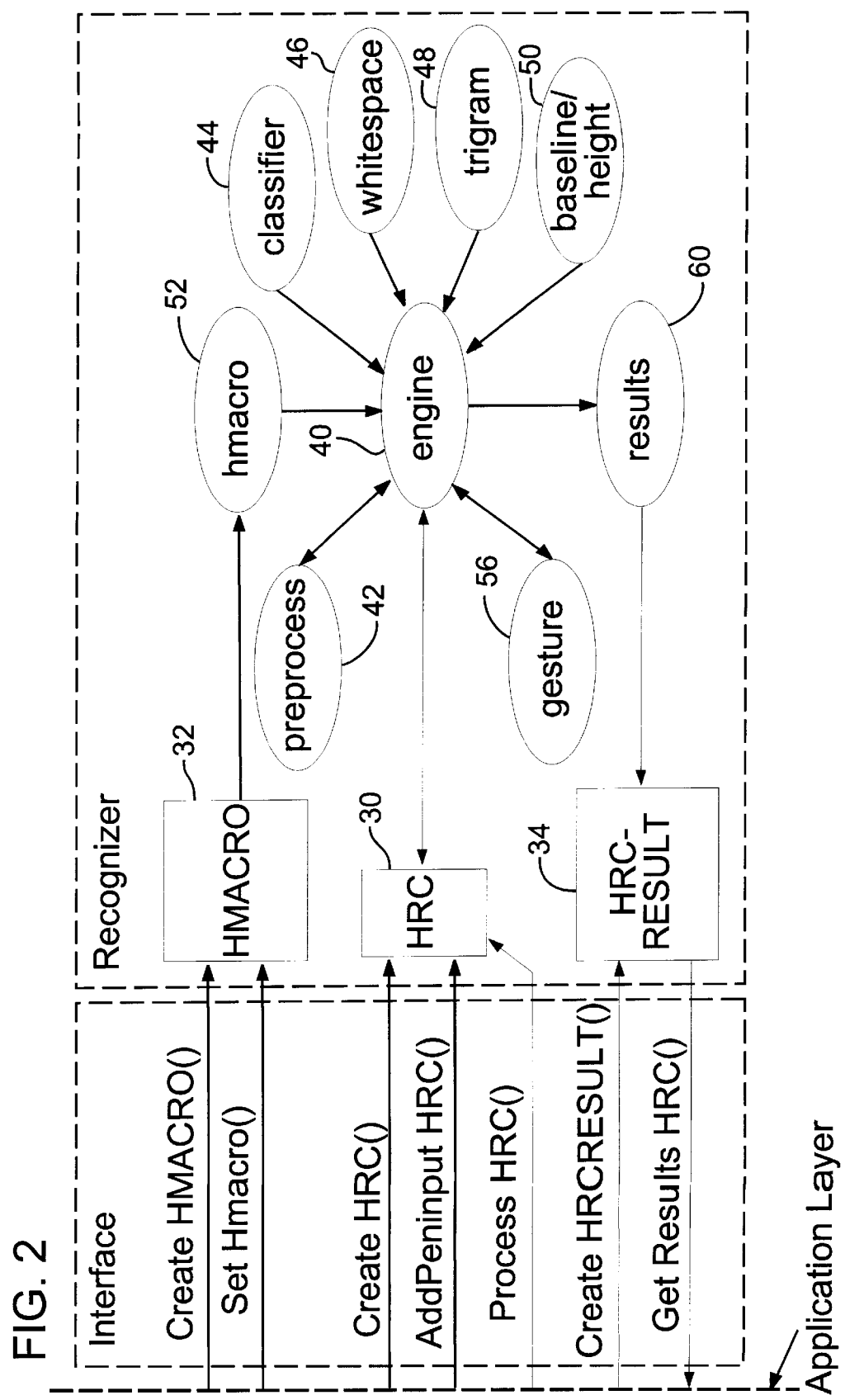
FIG. 2 is a diagram depicting the primary components of the recognizer and its interaction with a computer application that can call upon the services of the recognizer.

FIG. 2 depicts the overall scheme of the present recognizer and its relationship with an application that calls upon the recognizer to perform a recognition task. The recognizer is a component of the computer operating system. It may be called upon via a predefined set of application program interfaces (APIs). In a preferred embodiment, the computer program aspect of the recognizer is coded in C programming language and interacts with the application via three main objects. In this implementation, the objects are designated HRC, HMACRO and HRCRESULT. These objects are respectively designated with reference numerals 30, 32 and 34 in FIG. 2.

HRC is the root object that is used by the application to interact with the recognizer. The life span of this object is one recognition task. This object is responsible for setting, via member functions, recognition parameters and other necessary information (input flags, language codes, guide structures, etc.) for the recognizer.

HMACRO is an object that is created by the application for providing context information, such as application-specified word lists, to the recognizer.

HRCRESULT is the object to which the recognizer provides the results of the recognition task. The application queries this object to obtain the results.

Also depicted in FIG. 2 is a schematic representation of several modules employed by the recognizer for carrying out the recognition task. More particularly, the recognizer includes an engine module 40 and associated modules for processing the ink data that is provided by the application via the HRC object 30.

A preprocess module 42 filters and smoothes the sampled ink data received from the tablet. The preprocess module 42 extracts from the sampled ink data the information that is necessary and sufficient for a classifier module 44 to provide hypotheses as to which characters may be represented by the ink data.

It is noteworthy here that the term "stroke" will be used to refer to the data generated as the pen tip is moved across the tablet screen 28 FIG. 1(a) from the location where the tip first contacts the screen to the location where the tip is removed from the screen. For example, the writing appearing on the screen 28 of FIG. 1(a) depicts four strokes, one being the vertical member of the "T", the other being the horizontal member of the "T", the third stroke being the letter "h", and the fourth stroke comprising the letter "e".

The engine module 40 delivers to the classifier module 44 the preprocessed data from module 42. The data is delivered in groups of discrete sequences or "frames" of ink data. For each frame group, the classifier module 44 returns to the engine module 40 a set of character hypotheses, which may be referred to as candidates. For each candidate, there is assigned an associated probability that the candidate corresponds to that written on the tablet by the user.

Groups of character candidates are provided by the engine module 40 to a gesture module 56, a whitespace module 46, a trigram module 48, and a baseline/height module 50.

The gesture module 56 reviews each character candidate to determine whether it represents a gesture, which is a specific system-defined command. For example, when the user writes an encircled "c", the gesture module will note whether what is written is a predefined gesture. The encircled "c", for example, may be a predefined gesture indicating that a portion of text is to be copied. If a gesture is found, the recognizer immediately returns control to the application with the identified gesture placed in the HRCRESULT object.

The whitespace module 46 calculates the probability that any two character candidates are separated by a whitespace. This information is returned to the engine module and used in the search for the best result(s). By "best result" is meant the character string returned by the recognizer at the completion of the recognition task.

The trigram module 48 reads three adjacent character candidates given to it by the engine module and provides a probability of the occurrence of those three characters in the language. For example, for the adjacent characters "t" "h" and "e", the trigram module will return a very high probability, while the adjacent characters "t" "l" and "e" would return a relatively lower probability. This information is used by the engine module in searching for the best result. It is noteworthy here that although a trigram (that is, three successive letters) is used in a preferred implementation of this system, any number of successively occurring letters, such as bigrams, may be used with this module.

The baseline/height module 50 compares the relative sizes of adjacent characters and, for example, returns to the engine module a probability that the first of the characters is an uppercase letter.

The hmacro module 52 is a mechanism for providing to the engine module 40 specific contextual information, such as word lists, that is provided by the application via the HMACRO object 32. For example, the application may provide the recognizer with the last name of the computer user. That name would be considered during the searching undertaken by the engine module.

With the information received from the classifier, whitespace, trigram, baseline/height and hmacro modules, the engine module searches as described hereinafter for the best result of the handwriting recognition task. The one or more best results determined by the search process are provided to a result module 60 and obtained by the application upon a query of the HRCRESULT object 34.

Turning now to the particulars of the recognizer and with reference to FIG. 2, the application, for each handwriting recognition task, creates the HRC object via the CreateHRC API call. The application passes to the recognizer the input ink data via the AddPenInputHRC API call. The application also provides for the recognizer an amount of processing time via the ProcessHRC API call.

Figure 3:
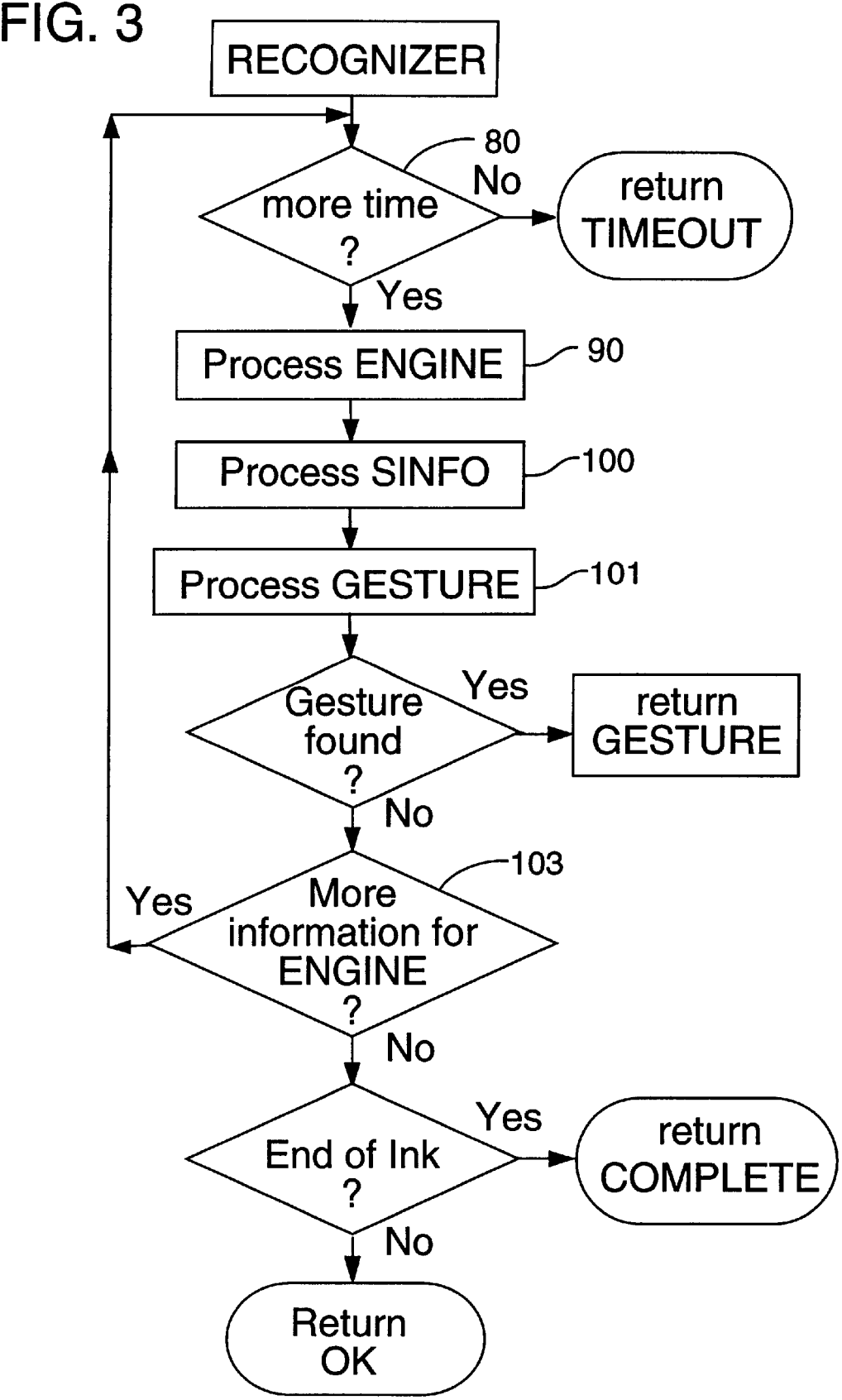
FIG. 3 is a flow chart representing the overall processing undertaken by the recognizer.
Figure 6:
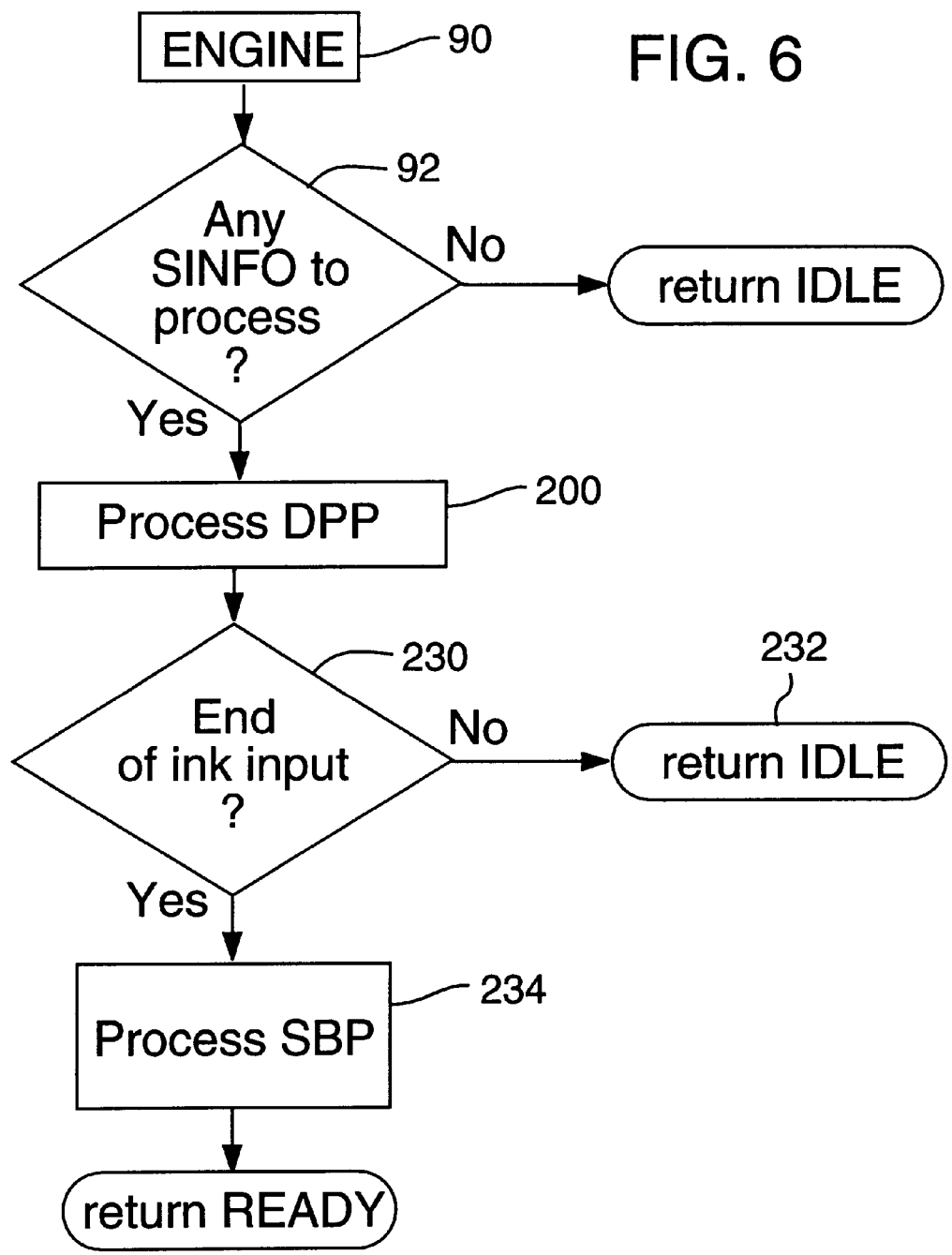
FIG. 6 is a flow chart of a portion of the recognizer, an object designated ENGINE, that controls the overall search procedure for generating the best handwriting recognition result(s).

As processing time is available (see step 80, FIG. 3), the recognizer first invokes the ENGINE object 90. For the present it is assumed, however, that no information has been prepared for the ENGINE object to process and, therefore, control immediately returns to the main recognizer program (see step 92, FIG. 6). The recognizer next invokes at step 100 an object (FIG. 3), designated SINFO (for search information), which is one of the primary objects of the engine module. As shown at 101, FIG. 4, the SINFO object immediately returns control if there is no ink to process. Considered next is the situation where ink data is available.

Figure 1B:
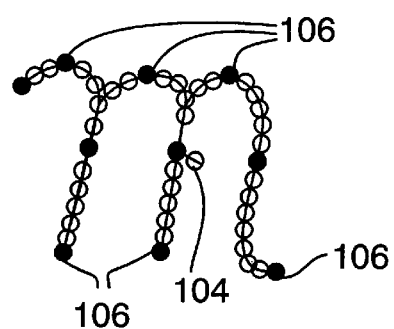
Figure 1C:
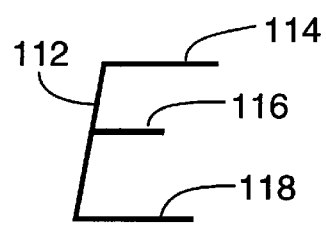

Indicated at 102 (FIG. 4), the "Ink data preprocess" step is carried out, whenever ink data is present, by the above-mentioned preprocess module 42. The preprocessing is best considered in conjunction with the drawing of FIG. 1(*b*). FIG. 1(*b*) is a drawing that is illustrative of how the x-y coordinate data is collected by the tablet 20 (FIG. 1(*a*)). There, the letter "m" was drawn by a user. Since the x-y data from the tablet is sampled up to 200 times per second, there is generated in drawing an "m" a multitude of data points.

The ink data preprocessing step 102 first removes from the received data any points that can be characterized as noise, such as shown at point 104 in FIG. 1(*b*). Next, a limited amount of essential x-y data is extracted from the multitude of sampled data coordinates so that the classifier 44 and other modules may efficiently process the information. One method of extracting this essential data is to note along the entire ink stroke "extrema" points, such as shown by the solid circles 106 in FIG. 1(*b*). The extrema 106 represent the uppermost peaks and lowermost valleys of the stroke. In this instance, the stroke is the entire letter "m".

With the extrema 106 recorded, several intermediate data points (illustrated as hollow circles in FIG. 1(*b*)) between the extrema 106 may then be extracted from the data. The extracted data points represent the essential features of the ink and are stored for further processing. In this regard, the preprocessed ink data corresponding to one stroke of ink is stored as a "frame", all of the preprocessed ink strokes are stored as an array of frames. (Hereafter, a preprocessed stroke will usually be referred to as a frame.)

Figure 4:
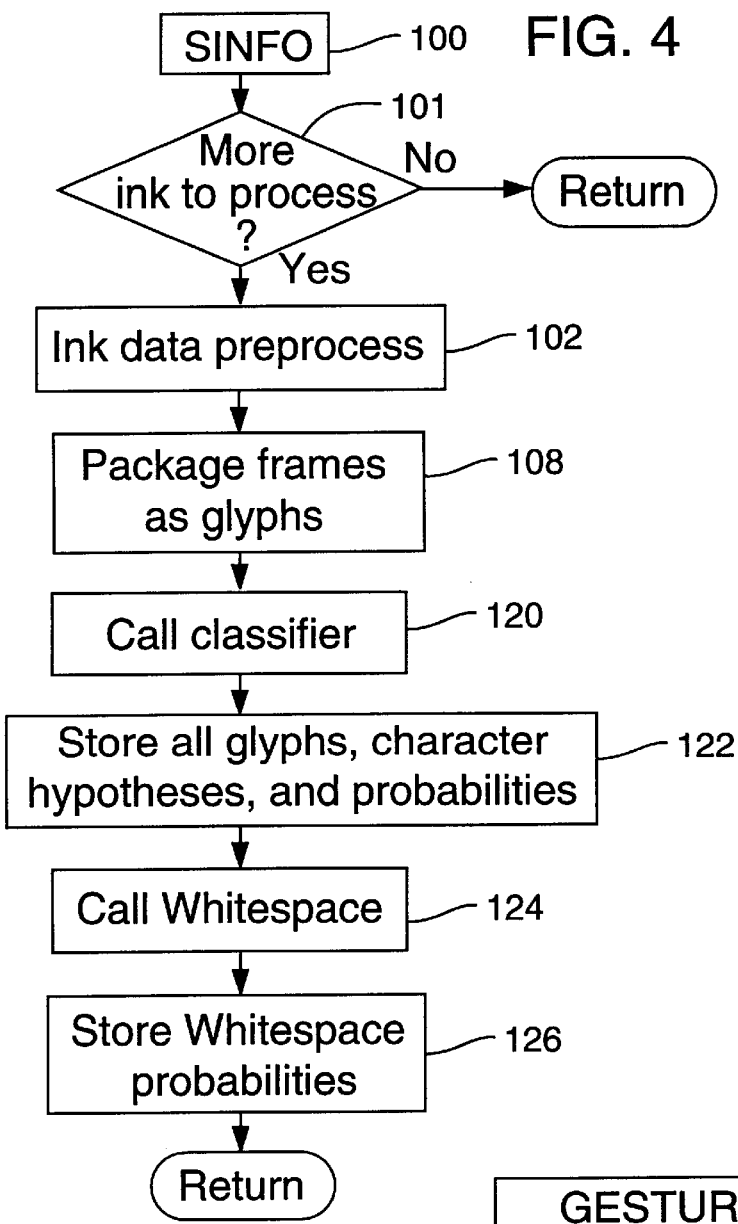
FIG. 4 is a flow chart representing the processing undertaken by a portion of the recognizer, an object designated SINFO, that establishes and stores for later processing certain information relating to ink data that is provided by the application.

As shown at step 108 in FIG. 4, the processing undertaken by the SINFO object 100 next packages a number of adjacent frames of input data for analysis by the classifier module 44. In this regard, a "glyph" is considered as one frame, or a combination of a few frames. Glyphs are passed to the classifier to determine which characters they may represent.

In a preferred implementation, the glyphs are grouped in separate combinations of one, two, three and four frames. A group of four glyphs, therefore, is associated with each frame. For example, with reference to FIG. 1(*c*), when one prints the uppercase letter "E", four successive strokes are employed, 112, 114, 116, 118. Once the x-y data representing these four strokes is preprocessed as mentioned above, the recognizer will, for each frame (referring here, for example, to the frame associated with the last-made stroke 118) package (i.e., arrange in computer memory) a group of associated glyphs. For the frame corresponding to stroke 118, the associated glyph group will include a glyph comprising only the frame 118 data; a glyph comprising frame 118 and the immediately prior frame 116; a glyph comprising frames 118, 116, and the prior frame 114; and a glyph comprising the data of frames 118, 116, 114, and 112. In the preferred embodiment, the maximum number of frames assembled into a glyph is four, inasmuch that users do not combine more than four strokes into an English-language character.

It is noteworthy here that as an alternative to the "free" handwriting input discussed above, the pen and tablet system may define on the screen 28 (FIG. 1*a*) "boxes" within each of which a user is to enter a single alphanumeric character. In such an instance, the glyph packaging carried out by the SINFO object (step 108, FIG. 4) would entail grouping all of the frames contained within a particular input box as a single glyph for analysis by the classifier. Except as noted below, the application, via an attribute of the HRC object, provides to the SINFO object data representative of the boxes or guide structure employed by such a tablet system. The hereafter described searches are carried out in the same manner irrespective of whether boxed or free input is used.

Once the group of four glyphs associated with each frame of free-input ink data is packaged, the SINFO processing at step 120 (FIG. 4) invokes the classifier. The classifier reviews the glyph group of each frame to determine whether the shape of any glyph corresponds to an alphanumeric character. In instances where character shapes are found, the classifier returns for each such glyph the one or more likely character candidates, the candidates may be referred to as character hypotheses. For each candidate, the classifier also provides a probability value relating to how closely that candidate matches the glyph as written by the user. The classifier, which may be referred to as a shape recognizer, is a statistically based type using y extrema based features.

For example, for the glyph comprising the four frames 112, 114, 116, 118 depicted in FIG. 1(*c*), the classifier would return a character hypothesis, the letter "E", with a very high probability of its occurrence (assuming that the "E" is precisely drawn as shown in the Figure). Depending upon how carefully the "E" glyph is formed, other shapes, such as an "F" with a lower probability value may also be returned as a candidate.

The glyph and corresponding character hypotheses with associated probabilities are then stored by the SINFO object, step 122 (FIG. 4), for later use during the search.

After all the glyph groups for all of the currently available glyphs are analyzed by the classifier, the SINFO object, step 124 in FIG. 4, invokes the whitespace module. The whitespace module 46 compares the x-y data of a given character candidate with that of the immediately prior candidate. If the size of the space between two adjacent candidates exceeds a threshold amount representative of typical spacing between adjacent characters, the whitespace module will return for that candidate a value representing a high probability of a space between characters. As indicated in step 126 in FIG. 4, the whitespace probabilities associated with each character are stored for use by the engine module. As noted earlier, the probability of whitespace characters is considered in the search for the best recognition result. In instances where "boxed" input is employed as described above, the whitespace module is not invoked since word boundaries are made explicit by that input format.

When the SINFO object completes processing of currently available ink data, it returns control to the main recognizer, and a GESTURE object 101 (see FIG. 3) is then invoked.

Figure 5:
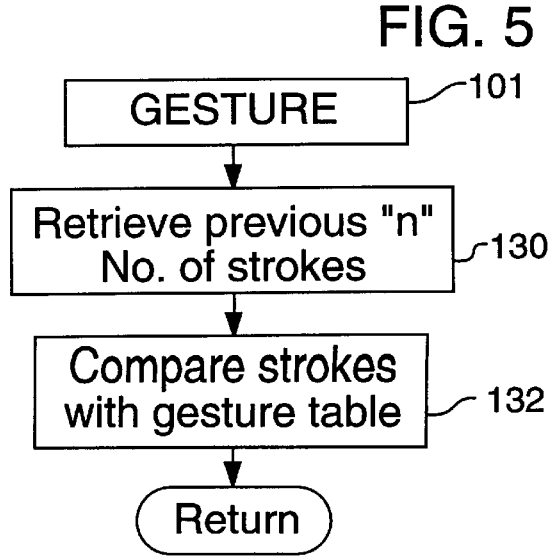
FIG. 5 is a flow chart representing the processing undertaken by a portion of the recognizer, an object designated GESTURE, for detecting whether the ink data represents a specified gesture.

The GESTURE object (FIG. 5) determines whether any of the recently received strokes (stored as frames) comprises a gesture. As depicted in FIG. 5, GESTURE compares the preprocessed x-y data corresponding to a successive set of strokes (for example, three successive strokes) with tabulated data corresponding to system-defined gesture possibilities (steps 130, 132, FIG. 5), such as the encircled "c" described earlier. GESTURE then returns to the main program with an indication of which, if any, gestures have been entered by the user. Any detected gesture information is immediately placed in the HRCRESULT object and made available to the application. It will be appreciated that the processing carried out by GESTURE module is not required for the recognition task processing. In this regard, the GESTURE module is demonstrative of how a discrete system requirement (gesture identification) may be readily incorporated into the present recognition system to complement the recognizer.

If no gesture is found, the recognizer at 103 (FIG. 3) determines whether there has been stored by the SINFO object any (or more) information for the ENGINE object to process. If such information is present, and processing time remains (step 80), the recognizer again calls ENGINE (see FIG. 6), which is another primary object of the engine module, for carrying out the above-mentioned searches to arrive at the best result of the recognition task.

The ENGINE object retrieves all of the information about the ink given to the recognizer and combines the information in a meaningful way to generate the optimal solution or best guess via the dynamic programming (DPP) search and stack-based, bounded path (SBP) searches mentioned above.

When data (designated "search information" to represent what has been processed by SINFO) is available for processing by the ENGINE object (step 92 at FIG. 6), the DPP object 200 (FIG. 6) is invoked by the ENGINE object. The DPP object is called upon to process one granularity, in this instance a frame of preprocessed ink, for extending dynamic programming paths.

Figure 7:
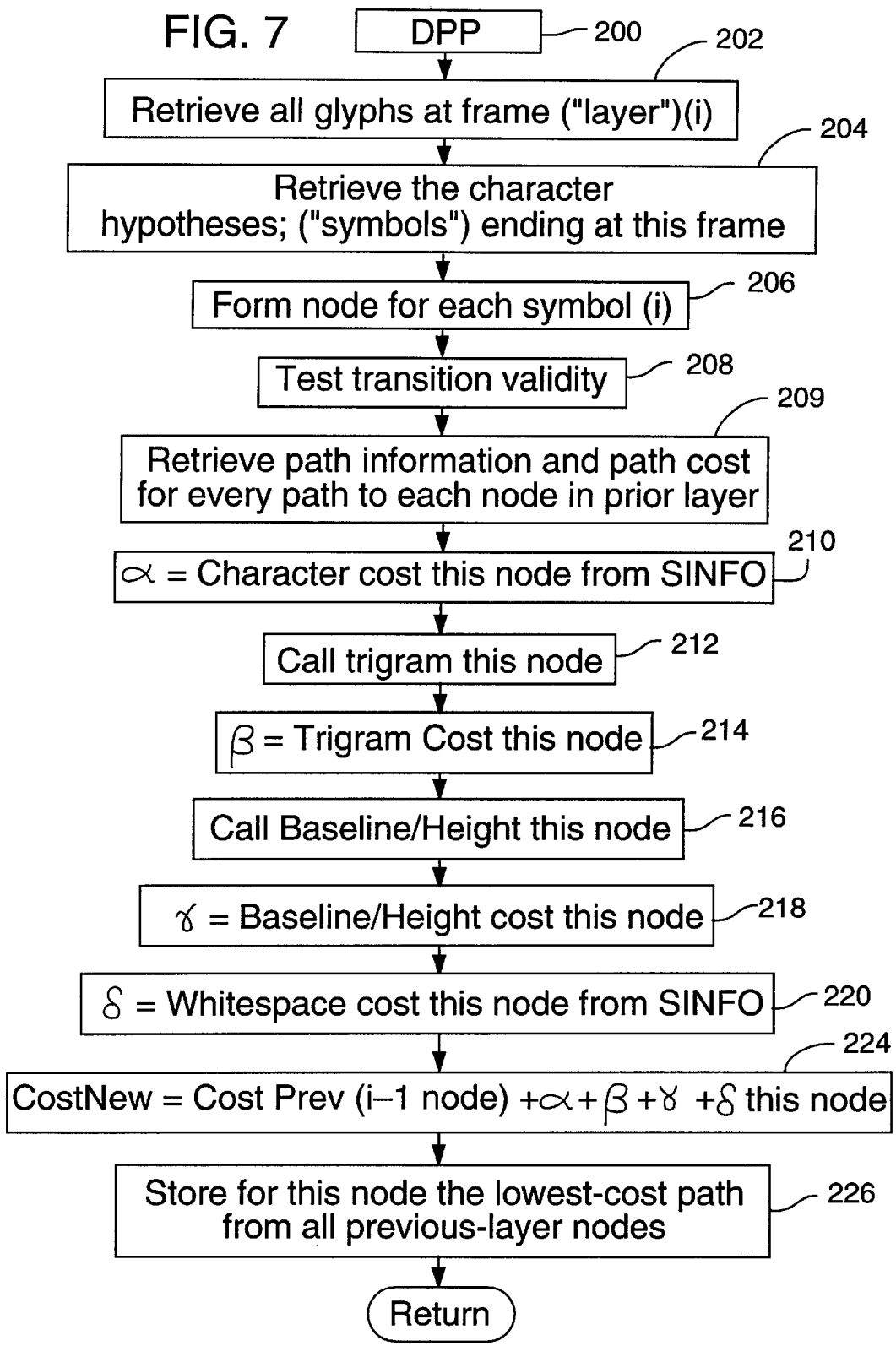
FIG. 7 is a flow chart representing the processing undertaken by one of the two search techniques, designated DPP, used by the recognizer.

With reference to FIG. 7, the DPP search at step 202 first retrieves for the frame (for DPP search purposes, the frames are considered layers of the search paths) all of the glyphs that were packaged for this frame as explained above in connection with the SINFO object 100 (FIG. 4).

Next, at step 204, DPP retrieves from the SINFO search information each of any character hypotheses (referred to in the search as a "symbol,") that were returned by the classifier when the glyph group of this frame was considered by the classifier. Thus, step 204 retrieves for a given layer, all of the character candidates ("symbols") that were returned by the classifier.

Step 206 indicates that the DPP object establishes a node of a search path for each such symbol associated with the frame or layer "i" under consideration.

As will be explained, the DPP search object later calculates the best path cost up to each node at the present layer from all of the previous nodes at the previous layer. The search, therefore, makes a forward pass, in the direction of first-received data (nodes) to last received. Before proceeding, however, it is noteworthy to point out that in a preferred implementation, the DPP search and the hereafter described SBP search determine as "best" costs the lowest path costs. Accordingly, the probabilities returned by the above-described modules (classifier, trigram, etc.) are transformed in the ENGINE object to least-cost values by converting the probabilities to their associated negative-log values. As a result, the aggregate of least-cost values returned by the several modules is determined by adding these negative-log values, thereby avoiding computational inefficiencies that would arise if probabilities were multiplied to arrive at the aggregate values.

Before calculating the dynamic programming search path cost as mentioned above, the DPP object first, step 208, calls the hmacro module 52 to determine whether the path up to all of the nodes of the layer under consideration is permitted by any template supplied by the main application via the HMACRO object mentioned above. If such transition validity is acceptable, the DPP object, step 209, retrieves, one-at-a-time, the path information (character string) and aggregate least-cost value for every path, as calculated up to each node that is located in the layer immediately prior to the layer of the node under consideration.

Over the series of steps explained next, the DPP search calculates the path up to the node under consideration (CostNew) by adding to the path cost up to the previous node the cost values associated with the node under consideration.

Specifically, at step 210, DPP retrieves for the node under consideration the character least-cost value $\alpha$ that was returned by the classifier for the symbol that now comprises the node under consideration.

Steps 212 and 214 indicate that the cost value, $\beta$, representing the trigram least-cost value from the trigram module 48 is also retrieved for the path node under consideration.

The baseline/height cost value $\gamma$ (steps 216, 218), and the above-described whitespace cost value $\delta$, step 220 are also retrieved for the node under consideration.

At step 224, the path costs (CostNew) to the node under consideration from each of the previous-layer nodes are separately determined, and the lowest path cost up to the node under consideration is stored, step 226, as a (partial) path cost estimate to be used by the SBP search, as described more fully below.

Once least-cost paths are established for all nodes at a particular layer (steps 208 through 226), the DPP search returns from its iteration. The ENGINE object then checks, step 230 (FIG. 6), to determine whether a flag provided by the application via the HRC object has signaled the end of ink input. If not, the ENGINE object returns control to the main recognizer program (FIG. 3), which, time permitting, again steps through the ENGINE, SINFO and GESTURE objects for (1) generating more search information in the event that more ink data has become available as the user continues to write on the tablet, (2) reviewing for gestures made by the newly added ink, and (3) extending the DPP object's dynamic search paths by one more layer. It will be appreciated with respect to the just-noted item (1), processing or construction of the dynamic search paths for ultimately finding the best result occurs even though the user has not necessarily finished writing onto the tablet. This aspect of the invention substantially speeds the final calculation of the best result.

Returning to consider step 230 of the processing carried out by the ENGINE object (FIG. 6), in the event that the end of ink input has been flagged by the application, the ENGINE then invokes at step 230 the SBP search for performing the above-mentioned stack-based bounded path search to arrive at one or more best results.

Figure 8:
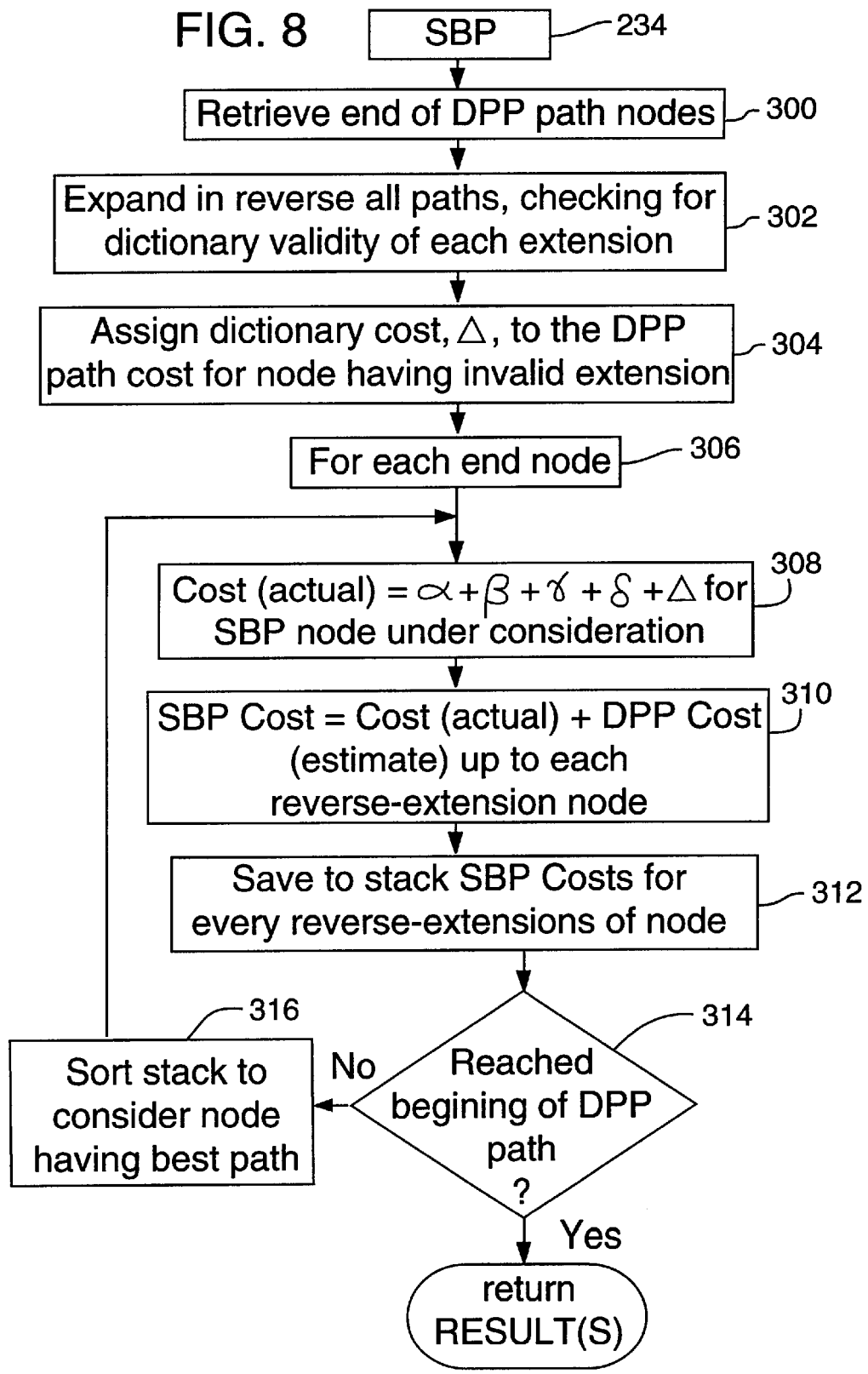
FIG. 8 is a flow chart representing the processing undertaken by the second of the two search techniques, designated SBP, used by the recognizer.

Specifically, with reference to FIG. 8, the SBP search first retrieves the nodes that occur at each end of the DPP paths (that is, the dynamic programming search paths established by the DPP object as mentioned above). At step 302 the SBP object expands, in reverse, from each node end toward the beginning of the DPP paths. The SBP object, at each node-to-previous-node expansion, consults the system dictionary and any application-supplied wordlist for determining whether the transition from one node to another yields a character string from the end node that is valid in view of the system dictionary or wordlist.

At step 304, the SBP object adds a dictionary cost $\Delta$, to the DPP partial-path cost (that is, the path cost calculated by the DPP object from the beginning of the path to the node in question) for the node associated with an invalid transition. In this regard, the assigned dictionary cost is relatively high so that the path that includes a dictionary cost will be unlikely to yield the best result. Similarly, a path that includes more than one assigned dictionary cost (as a result of step 304) will have even lower likelihood of becoming the best overall result.

It is noteworthy here that the extent to which the SBP search relies upon the dictionary may be established by the application that calls the recognizer. In this regard, one of the attributes of the HRC object may include a coercion variable set by the application for influencing the extent to which the SBP search should rely on the system dictionary. For example, a very high-valued coercion variable provided to the engine module via the HRC object would indicate that the recognizer is to reject any words not found in the dictionary. As a result, the SBP search would assign a very high dictionary cost $\Delta$, thereby to eliminate such paths.

Once the dictionary costs are assigned to all DPP paths, the SBP object, beginning its reverse search at each end node, step 306, calculates for each end node an "actual" cost (step 308) that comprises the sum of the character cost $\alpha$, trigram cost $\beta$, baseline/height cost $\gamma$, whitespace cost $\delta$, and (if assigned) the dictionary cost $\Delta$. These costs are immediately available because they are stored in connection with each node as earlier processed in the DPP search, which nodes provide the foundation for the reverse search carried out by the SBP search. In this regard, the phrase "SBP node" will sometimes be used to refer to the nodes considered by the reverse-direction SBP search.

After calculating the actual cost for an SBP node under consideration (for now, still referring to each of the end nodes of the DPP search paths), the SBP search at 310 then calculates the costs of all the path extensions between the SBP node under consideration and each immediately adjacent (i.e., toward the beginning) node. This reverse-path extension or SBP cost for an adjacent node comprises (1) the "actual" cost of the node considered (step 308) and (2) the DPP partial path cost up to the adjacent nodes.

The SBP object, step 312, saves to a stack the SBP costs associated with every reverse-path extension of the node under consideration.

At 314, the SBP object checks to determine whether the reverse-path extension has reached the beginning of the DPP path (that is, the beginning of the input). If not, the reverse paths held in the stack are sorted and the next node selected for consideration is that on the path having the "best" or lowest SBP cost (step 316). For that best-path node the search steps described at 308, 310, 312, and 314, FIG. 8, are performed. As apparent in step 314, the SBP search performs the steps 308, 310, and 312 for the paths corresponding to all of end nodes. When all of the searching is thereby completed, the SBP search returns with the best result represented by the content of the sorted stack assembled at step 312. This best result is provided via the result module to the HRCRESULT object and is accessible by the calling application.

It is noteworthy here that the SBP search is readily adaptable for providing more than one "best" answer. In this regard, the search, in iterating through steps 308, 310, 312, and 314 saves the nodes associated with several lowest-cost paths. Such results will be ranked according to cost and made available to the application.

Having now described the principles of the invention with reference to exemplary methods and systems, it should be apparent that these examples can be modified in arrangement and detail without departing from such principles. For example, although printed input was referred to in the detailed description, the present recognizer can readily handle cursive input by, for example, defining in the preprocess module a suitable division of the input into strokes. Such a preprocess module may be incorporated or "plugged" into the recognizer without the need to alter other modules of the recognizer.

The present invention can be implemented using a variety of different computer systems. One of which may be a personal computer using an Intel 66 MHz 80486 microprocessor, running the Microsoft Windows 3.1 operating system. The following represents exemplary data structures and functions that may be employed in programming in C language a digital computer to perform the functions described above:

Data Structures
SINFO
Stores the character probability generated by set of frames in terms of GLYPHSYM objects. Also stores the whitespace cost of different glyph combinations. This is one of the main objects contained in the HRC object.
GLYPHSYM
Stores the character hypothesis information associated with a glyph.
Stores the probabilities returned by the shape recognizer.
ENGINE
Contains objects DPP and SBP. Responsible for scheduling search engine processes between the two search objects. This is one of the main objects contained in the HRC object.
DPP
Contains information about the DPP search process. Stores all the nodes and path estimations to be used by the SBP search.
SBP
Contains information about the SBP search process. Stores the priority queue for the current search containing paths. Stores alternate results.
Functions
GLYPHSYM functions:
int CSymGLYPHSYM(GLYPHSYM*glyphsym)
Returns the number of symbol hypothesis associated with this glyph. Invoked by DPP and SBP modules.

SYM SymAtGLYPHSYM(GLYPHSYM*gtyphsym, int iSym)

Returns the ith symbol hypothesis for this glyph. Invoked by DPP and SBP modules.

PROB ProbAtGLYPHSYM(GLYPHSYM*glyphysm, int iSym)

Returns the cost of ith symbol hypothesis for this glyph. Invoked by DPP and SBP modules.

GLYPH GlyphGLYPHSYM(GLYPHSYM*glyphsym)

Returns the glyph itself. Invoked by DPP and SBP modules.

SINFO functions:

int ProcessSINFO(SINFO*sinfo, BOOL fEndOfInk)

Processes SINFO object one granularity. During the processing, SINFO object constructs a valid GLYPHSYM object based on given ink, invokes the shape recognizer for symbol hypothesis. It also performs segmentation for boxed recognition. This is invoked during the ProcessHRC API call.

BOOL SetGuideSINFO(SINFO*sinfo, LPGUIDE lpguide, int nFirst)

Sets the guide info. Invoked directly by the HRC object. This function is invoked during the SetGuideHRC API call.

BOOL SetAlphabetSINFO(SINFO*sinfo, ALC alc, LPBYTE rgbyte)

Sets the alphabet info. This function is invoked during the SetAlphabetHRC API call.

BOOL GetBoxResultsSINFO(SINFO*sinfo, int cAlt, int iSyv,

LPBOXRESULTS lpboxresults) Retrieves the box results currently stored in the recognizer. Retrieves character alternatives for the iSyv th symbol in the boxed input. This function is invoked during the GetBoxResultsHRC API call.

GLYPHSYM GlyphysmAtSINFO(SINFO*sinfo, int iFrame, int cFrame)

Retrieves the glyphsym object that contain the glyph with the following specification: the index of the last frame of the glyph is iFrame; the number of frames in the glyph is cFrame. This function is invoked by the search engine during the search.

ENGINE functions:

int ProcessENGINE(ENGINE*engine, BOOL fEndOfInk)

Performs DPP and SBP searches. At first, check to see if any new information has been added to SINFO object. If so, invokes ProcessDPP to give DPP object time to do some processing. Otherwise, invokes ProcessSBP to give SBP object time to do some SBP search. ProcesSENGINE is invoked during the ProcessHRC API call.

BOOL SetCoercionENGINE(ENGINE*engine, UINT uCoercion)

Sets the coercion level in the search engine. This function is invoked during the SetCoercionHRC API call.

BOOL SetMarcoENGINE(ENGINE*engine, HMACRO hmacro)

Sets the macro object with which the search process is done. A macro can be either a template, word list or a dictionary. This is propagated down to the DPP and SBP objects for use during the search process. This function is invoked during SetMacroHRC API call.

int CResultENGINE(ENGINE*engine)

Returns the number of results generated from the search. This number is less than or equal to the maximum number of results desired by the application. This is invoked during GetResultsHRC API call.

RESULT ResultAtENGINE(ENGINE*engine, int index)

Returns the ith result generated by the search engine. RESULT object is created and destroyed by the ENGINE object and the information is accessed through the member functions of RESULT class.

DPP functions:

int ProcessDPP(DPP*dpp)

Performs a single granularity of DPP search. This includes extending the existing path by one node and storing the best partial results. This function is invoked during ProcessENGINE call.

int CLayerDPP(DPP*dpp)

Returns the number of layers generated as the result of the DPP search. This is equal to the number of frames processed in the case of free input. In boxed input, this is equal to the number of boxes generated. This function is invoked in the SBP module.

int CFrameDPP(DPP*dpp)

Returns the number of frames processed. This function is invoked in the SBP module.

COST GetEstimateDPP(DPP*dpp, int iLayer, SYM sym)

Returns the best path cost estimation as the result of DPP search. iLayer is the index of the layer of DPP search. Sym is the ending symbol at the particular layer, for example, GetEstimateDPP(dpp, 3, (SYM)'a') returns the best DPP estimate of the path that ends in the letter 'a' after 4 frames (for free input). This function is invoked by the SBP module during the search.

SBP functions:

int ProcessSBP(SBP*sbp)

Processes one granularity of SBP search. This function is invoked during ProcessHRC API call.

int CResultSBP(SBP*sbp)

Returns the number of results generated by the SBP search currently invoked by the ENGINE module.

BOOL SetResultMaxSBP(SBP*sbp, int cMax)

Sets the maximum results desired by the SBP search. Invoked during ProcessHRC call when the application sets the desired number of results from the search.

What is claimed is:

1. A method of processing data that represents strokes of handwritten information, thereby to identify characters represented by the data, the method comprising the steps of:

receiving the data provided by a user, the data having a beginning part and an end part that define therebetween a complete amount of handwritten information to be processed;

assembling portions of the data into a sequence of packages; and determining for the sequence of packages a probable result set of characters represented by the sequence, the determining step occurring before the end part of the data is received and comprising the steps of simultaneously considering information pertaining to the character shapes represented by the packages and information pertaining to the literal context of the characters represented by the packages;

wherein the determining step includes searching for the result set of characters from among a plurality of character candidates using a first search technique; and wherein the first of two search techniques comprises the steps of:

developing for each package at least one path representing a string of character candidates, each path having a respective beginning and a respective end; and generating for each path a first cost value that reflects the probability that the path includes the result set of characters, the first cost value being based upon information pertaining to the character shapes represented by the packages and information pertaining to the literal context of the characters represented by the packages and wherein the second of the two search techniques assigns a second cost value to a considered path based upon the literal context of the considered path, and wherein the second search technique conducts a reverse search towards the respective beginning of at least some of the paths developed by the first search technique to identify the result set as a path having the lowest of the combine first and second cost values.

2. The method of claim 1 wherein the second of the search techniques assigns the second cost value to a considered path based upon whether the character string represented by the path appears in a dictionary.

3. The method of claim 1 wherein considering the information pertaining to the character shapes represented by the packages and the information pertaining to the literal context of the characters represented by the packages includes considering the likelihood of the occurrence of three adjacent character candidates.

4. The method of claim 1 wherein considering the information pertaining to the character shapes represented by the packages and the information pertaining to the literal context of the characters represented by the packages includes comparing the relative sizes of adjacent character candidates to establish whether one of the character candidates is an uppercase character.

5. A method of processing data that represents strokes of handwritten information, thereby to identify characters represented by the data, the method comprising the steps of:

receiving the data provided by a user, the data defining an amount of handwritten information to be processed;

assembling portions of the data into a sequence of packages;

determining for the sequence of packages a probable result set of characters represented by the sequence, the determining step comprising the step of simultaneously considering information pertaining to the character shapes represented by the packages and information pertaining to the literal context of the characters represented by the packages wherein the determining step includes searching for the result set of characters from among a plurality of character candidates using a first search technique and combining the first search technique with a second search technique that is performed subsequent to the first technique;

wherein considering the information pertaining to the character shapes represented by the packages and the information pertaining to the literal context of the characters represented by the packages includes considering whether the size of a space between two adjacent character candidates exceeds a predetermined amount representative of a space between adjacent character candidates.

6. A method of processing a received stream of data that is representative of stylus tip movement on a tablet or the like, comprising the steps of:

dividing the stream into a plurality of sequential frames;

combining the frames of input data into one or more packages;

assigning one or more character hypotheses to at least some of the packages;

constructing in a sequence conforming to the sequence with which the data is received paths of multiple character hypotheses;

assigning to portions of the paths values based upon the shape and literal context of the character hypotheses contained in the path; and reverse-searching the constructed paths in a direction opposite to the direction the data was received.

7. The method of claim 6 wherein the reverse-searching step includes using the values assigned in the assigning step to direct the reverse-search.

8. The method of claim 6 including the step of beginning the constructing step before the end of the stream of data is received.

9. The method of claim 6 including the step of receiving the data stream provided by a user, the data stream having a beginning part and an end part that define therebetween an amount of handwritten information to be processed and wherein the constructing step is executed as soon as the beginning part is provided by a user.

10. A handwriting recognition system for providing a result of a recognition task comprising:

input means for collecting ink data that represents strokes of handwritten information, the data having a beginning part and an end part that define therebetween an amount of handwritten information to be processed;

classifier means for providing character hypotheses based the ink data; and search means for selecting the result by substantially simultaneously considering the shape and literal content of the character hypotheses as soon as the beginning part is provided by a user.

11. The system of claim 10 wherein the search means includes first search means for modeling the collected ink data as dynamic programming paths each having a beginning and an end; and second search means for reverse searching the paths modeled by the first search means towards their respective beginnings.

* * * * *

UNITED STATES PATENT AND TRADEMARK OFFICE
CERTIFICATE OF CORRECTION

PATENT NO. : 6,137,908
DATED : October 24, 2000
INVENTOR(S) : Sung Sik Rhee

It is certified that error appears in the above-identified patent and that said Letters Patent is hereby corrected as shown below:

<u>Title page,</u>
FOREIGN PATENT DOCUMENTS, "0 439 743" should read -- 0 439 743 A2 --

<u>Column 4,</u>
Line 15, "FIG. 1(a)" should read -- (FIG. 1a) --

<u>Column 7,</u>
Line 44, "stack-based, bounded" should read -- stack-based bounded --

<u>Column 11,</u>
Line 1, "gtyphsym," should read -- glyphsym, --
Line 39, "contain" should read -- contains --
Line 58, "SetMarco" should read -- SetMacro --

<u>Column 14,</u>
Lines 42-43, "based the ink" should read -- based upon the ink --

Signed and Sealed this

Twenty-fifth Day of December, 2001

*Attest:*

*Attesting Officer*

JAMES E. ROGAN
*Director of the United States Patent and Trademark Office*